(12) United States Patent
Evans

(10) Patent No.: US 9,028,685 B2
(45) Date of Patent: May 12, 2015

(54) HIGH RESIDENCE TIME MIXING TANK SYSTEM

(75) Inventor: Wind Evans, Barrington, RI (US)

(73) Assignee: Flexcon Industries, Inc., Randolph, MA (US)

(*) Notice: Subject to any disclaimer, the term of this patent is extended or adjusted under 35 U.S.C. 154(b) by 712 days.

(21) Appl. No.: 13/116,886

(22) Filed: May 26, 2011

(65) Prior Publication Data

US 2011/0290797 A1    Dec. 1, 2011

Related U.S. Application Data

(60) Provisional application No. 61/348,947, filed on May 27, 2010.

(51) Int. Cl.
| C02F 1/52 | (2006.01) |
|---|---|
| C02F 1/76 | (2006.01) |
| C02F 1/00 | (2006.01) |

(52) U.S. Cl.
CPC . *C02F 1/76* (2013.01); *C02F 1/003* (2013.01); *C02F 1/5281* (2013.01); *C02F 2201/003* (2013.01); *C02F 2201/004* (2013.01); *C02F 2303/04* (2013.01)

(58) Field of Classification Search
CPC ............ C02F 1/003; C02F 1/006; C02F 1/50; C02F 1/5281; C02F 1/76; C02F 2201/003; C02F 2201/004; C02F 2303/04; B65D 25/00

USPC .......................................... 210/205, 206, 220
See application file for complete search history.

(56) References Cited

U.S. PATENT DOCUMENTS

| 5,855,777 A * | 1/1999 | Bachand et al. .............. 210/205 |
| 2005/0072729 A1 * | 4/2005 | Bridges et al. ................ 210/469 |

* cited by examiner

*Primary Examiner* — Lucas Stelling
(74) *Attorney, Agent, or Firm* — Barry G. Magidoff; Paul J. Sutton

(57) ABSTRACT

A water purification system for continuously disinfecting water in a holding tank that provides uniform mixing and increased residence time. The system comprises a double disinfectant tank for potable water, comprising an inner tank and an outer tank. The inner tank being located wholly within and in the lower portion of the outer tank. The water and disinfectant inlet feeds water directly into the inner tank through a tube extending into the inner tank. The inner tank is sealed off from the outer tank except for limited openings located primarily in the lower half of the inner tank wall. The inlet tube preferably extends at least about 50% of the height of the inner tank, to a point above the location of the limited openings in the lower half of the inner tank. This results in better mixing, especially when the flow through the limited openings is high enough to create turbulent flow, and greater residence time compared to baffled tanks.

10 Claims, 8 Drawing Sheets

DETAIL A

HIGH RESIDENCE TIME MIXING TANK SYSTEM

This application claims the benefit of priority pursuant to 35 U.S.C. 119(e) from U.S. provisional patent application having Application No. 61/348,947 filed May 27, 2010.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention is directed to a system for disinfecting water generally for use for individual buildings or transient public water systems, such as at a store or other commercial establishment, or other public space, such as an airport. It has become extremely important today, in most sections of the world, to clean household water before use, including the killing of microbial parasites that cause illness and even death in humans. Such systems are referred to as "point of use ("POU")" water disinfecting systems, where a single structure receives water, for example, from a well or stream of somewhat unclean provenance.

Water can be rendered microbe-free and parasite-free by the use of filtration systems which tend to be costly, except for individual use, or for entire homes, require expert care. Water can also be disinfected by exposure to ultra-violet radiation or to high temperatures, where the water is boiled for several minutes. This is generally not effective or practical for a building system, although it may be useful, for example, when camping out. Chemical disinfection is generally considered the most reliable and practical way to proceed, with the most common chemical used being a chlorinating material. Such chlorinating materials, such as hypochlorites, are especially useful for disinfecting water, as it is relatively simple to provide a concentration of chlorine in the water sufficient to kill any parasites living in the water, including bacteria, viruses and cysts or other creatures that may invade the human system, but below the concentration that will cause harm to the health of an individual person. Other materials which have been used include iodination systems and oxidizing systems based upon the addition of ozone or a peroxide or permanganate chemical. Such materials are effective but it has been found that because there is no residual effect, they are not sufficient to maintain a pure system where water is stored before use. In addition to removing harmful parasitic agents, including microbes, chlorination is also useful to oxidize inorganic materials which cause odor or turbidity in the water, such as iron, manganese and sulfur compounds, such as the oxides or hydrogen sulfide.

It has been found that in order to properly and safely use chlorinating compounds, it is necessary to ensure that the compounds are uniformly mixed throughout the water system and that there be sufficient resident time to ensure that the chlorine compounds have time to act to reduce the pH of the water and to kill any parasitic agents living in the water. Useful such chlorinating agents include, for example, sodium hypochlorite or calcium hypochlorite. Although chlorine gas can be used, it is generally not considered practical for use for individual households. The hypochlorite can be added as a divided solid or as a liquid solution in water.

In the United States, at least, the basic concept for a suitable chlorination disinfecting system is determined by calculating a value referred to as "CT", where C represents a concentration of free chlorine residual in mg/l and T is contact time in minutes; the contact time is determined based upon the flow rate of the system and the size of the holding tank.

It has also been recognized that baffling of the flow through the tank is important in order to ensure uniform mixing of the disinfecting compound in the water. Examples of such prior baffling are shown for example in an article entitled "Disinfection".

SUMMARY OF THE INVENTION

The present invention improves on the prior art by providing a water purification apparatus and method for continuously treating water in a holding tank that provides uniform mixing by way of a unique holding tank system that provides an unusual method of baffling the flow, and that provides means for the removal of any precipitating material that should be removed before passing the water for human use. The system includes an outer tank, an inner tank wall sealed from the outer tank except for specifically placed orifices through the wall of the inner tank, and a water and chlorinating inlet to the inner tank and an outlet for water flow from the outer tank, after disinfection has been completed. This tank provides uniform mixing of the water and chlorinating agent, and a sufficient residence time to meet the CT standard set by most health agencies in the United States.

The present invention is most generally defined as a mixing and storage tank system for disinfecting potable water. The tank provides for adequate mixing as well as storage by virtue of having an inner tank and an outer tank, where mixing occurs not only at the time the disinfecting material is added to the water, preferably before entering the inner tank, but also within the tank system, as the water moves through the tanks. The tank system includes an outer shell and a porous inner shell disposed wholly within the outer shell. The inner shell is formed of preferably non-flexible walls, and is generally formed from two halves, where the halves are joined either by clips or by welding. The edges between the two halves are formed so as to preferably form a seal, although such a seal is not critical in the present context, so that small quantities of water can flow outwardly between the two halves of the inner tank, into the outer tank volume without compromising the residence time. The lower portion of the inner shell is preferably securely fastened, as by welding, to the inner wall of the outer shell, near the bottom, and water passes initially into the inner tank, from outside of the double tank.

The water enters through the bottom of the double tank passing initially through a tube, or pipe, which extends through the outer tank wall and the inner tank wall into the inner tank volume, for filling the inner tank, through an elongated inlet tube. The chlorinating disinfectant is generally added to the inlet pipe upstream of where the water enters the tanks. The double tank system ensures adequate mixing of the chlorinating material with the water, beginning in the inner tank, as it passes through it, and maintains the needed residence time, even when water is continuously flowing out to the outer tank volume. To further improve mixing, a diffuser cap preferably covers the end of the inlet pipe. Water can be stored in the tanks until it is called for use by persons in the building. Water generally exits from the top of the tank, through the outer tank wall; the inner tank volume being preferably not more than half of the volume of the outer tank.

Orifices are provided, circumferentially around, preferably, the lower half of the inner tank, through the inner tank wall, to provide for passage of water from the inner tank into the outer tank. When flow is strong, clearly the flow through the orifices will be turbulent, further ensuring mixture both within the inner tank and in the outer tank, including after the outer tank liquid may have sat for an extended period without flow.

Thus, although the inner and the outer tanks are in fluid flow connection, there is a certain pressure drop between them which provides the impetus for the desired mixing. Generally the flow from the inlet pipe and out through the outlet pipe from the outer tank, pass through a flow cross-section area larger than the combined cross-section areas of the orifices through the inner tank wall, so as to ensure a higher velocity through the orifices, as the inner tank water exits to the outer tank, thus enhancing turbulence.

The inlet pipe extends upwardly through the outer tank wall and into the inner tank, extending above the lower wall. Adjacent the inlet pipe, preferably, is a drain opening, extending through the inner tank wall and opening into the bottom of the outer tank; this drain opening is intended to remove any sludge or other precipitate that may accumulate in the tanks, also when emptying the tanks.

Although it does not form part of the present invention, the chlorinating disinfecting material is added prior to entry into the tank through a T in the pipe leading from the water source. Thus, the cross-sectional area of the orifices exiting the inner tank plus the drain pipe is less than the cross-sectional area of either of the inlet pipe or the outlet pipe in a preferred embodiment.

It has been found useful to form the inner tank in two halves, and to utilize clench rings to clamp the two halves of the inner tank together. This system is not a part of this invention, but represents a practical way to form the inner tank and to join it with the necessary plumbing, i.e., the inlet tube and the drain hole. The volume of the inner tank is preferably not more than half that of the volume of the outer tank to ensure sufficient mixing and residence time before the water leaves the outer tank through the top outlet. The inner tank volume can be between about 30% and 70% of the total outer tank volume, but preferably less than 50% of the outer tank volume; the inner tank preferably extends in height from 30 to 60% of the height of the outer tank, and most preferably the inner tank is at least about 50% of the height of the outer tank. The external diameter of the inner tank, at its widest point, can be as much as 95% of the internal diameter of the outer tank, but preferably not more than about 90% of the internal diameter. This provides an orifice effect to the flow of the water through the outer tank, thereby increasing the likelihood of turbulent flow and therefore better mixing in the outer tank.

The height of the inlet tube extending into the inner tank can be as much as 95% of the total height of the inner tank, and preferably up to 90% of the height of the inner tank. Most preferably the inlet tube is at least about 50% of the height of the inner tank. Preferably, the inlet tube, for the usual size for residential use, is between about 18 ins. and 30 ins.

The invention is exemplified with reference to a particular embodiment shown in the following drawings. This embodiment is shown by way of example and is not meant to be limiting in any way.

DETAILED DESCRIPTION OF THE INVENTION

Figure 1:
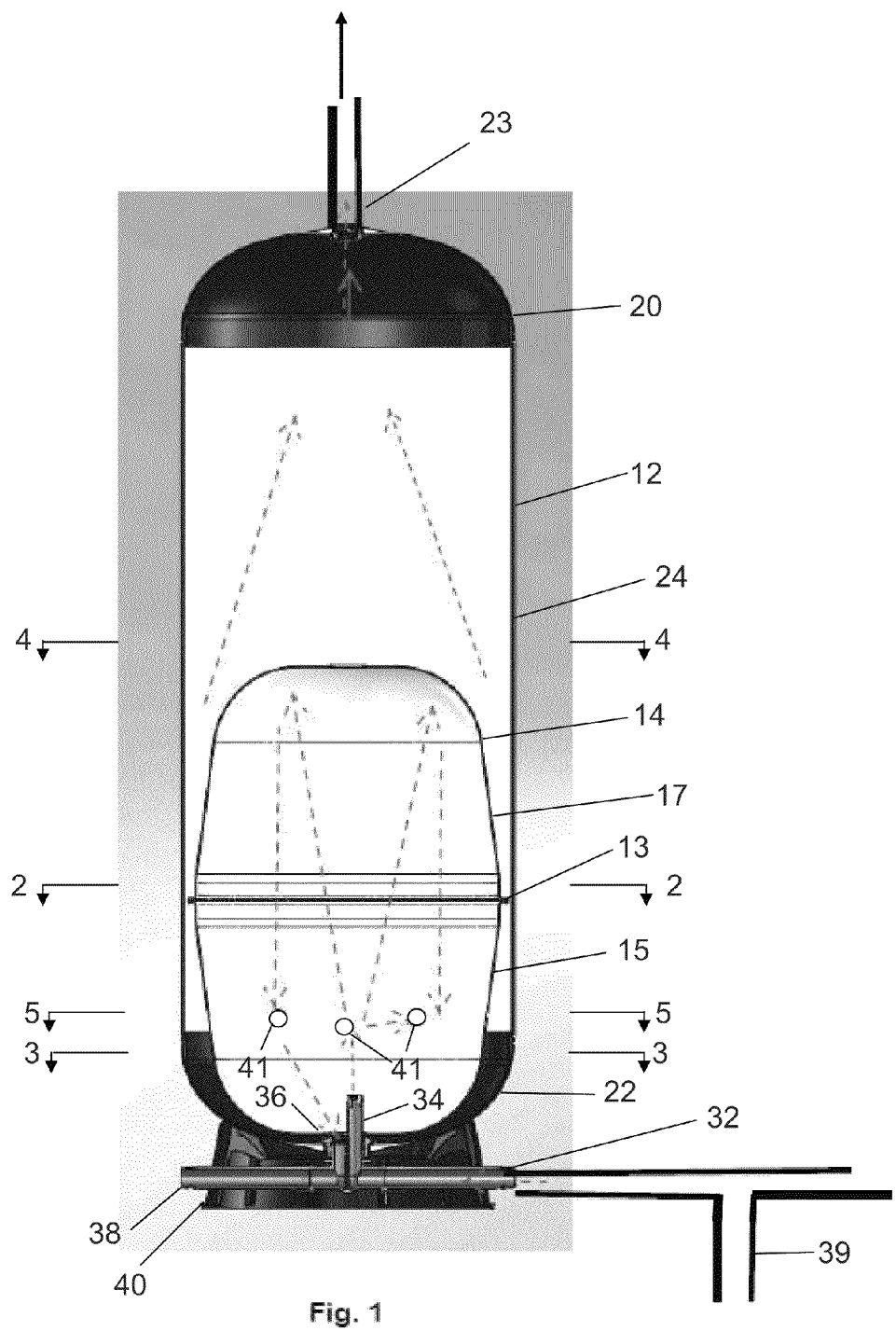
FIG. 1 is an elevational cross-section view showing the inner and outer tanks and inlets and outlets of the double tanks of the present invention.
Figure 2:
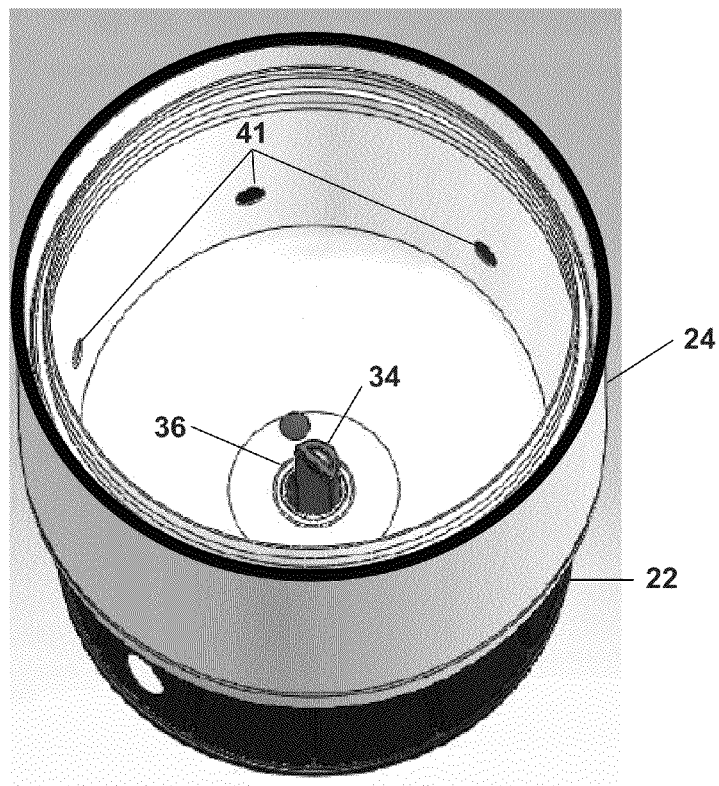
FIG. 2 is a cross section view along lines 2-2 of FIG. 1, showing the relationship of the lower half of the inner tank and the outer tank in an isometric view.

FIG. 1 shows a cross-section of an assembled double-walled, baffled tank according to an embodiment of the invention. The double-walled tank includes an outer shell, generally indicated as 12, and internal walled tank, generally indicated as 14. Once assembled, the double-walled, baffled tank is connected to a water connection 32 and supported by a stand 40. The water connection 32 may be constructed of poly(vinyl chloride), steel, or any other suitable material. Stand 40 can be fabricated from polyethylene, steel, or any other suitable material.

The outer shell of the double tank can preferably be formed of a fiberglass-reinforced epoxy resin with a polypropylene coating.

The inner tank 14 can preferably be formed of a rigid polypropylene. Alternatively, the upper half of the inner tank 17 can be a flexible diaphragm, and can be constructed, for example, as in U.S. Pat. No. 4,784,181 or in U.S. patent application Ser. No. 10/828,980. The lower half of the inner tank 15 is provided with a series of circumferentially arranged apertures 41, extending through the rigid inner tank wall and connecting the inner volume of the inner tank to the inner volume of the outer tank. The apertures 41 are circumferentially distributed around the lower half of the inner tank wall 15. There are preferably between 6 and 8 apertures, or orifices, in total, preferably having a total flow area of from 60 to 99% of the flow area of each of the inlet and outlet pipes.

Figure 3:
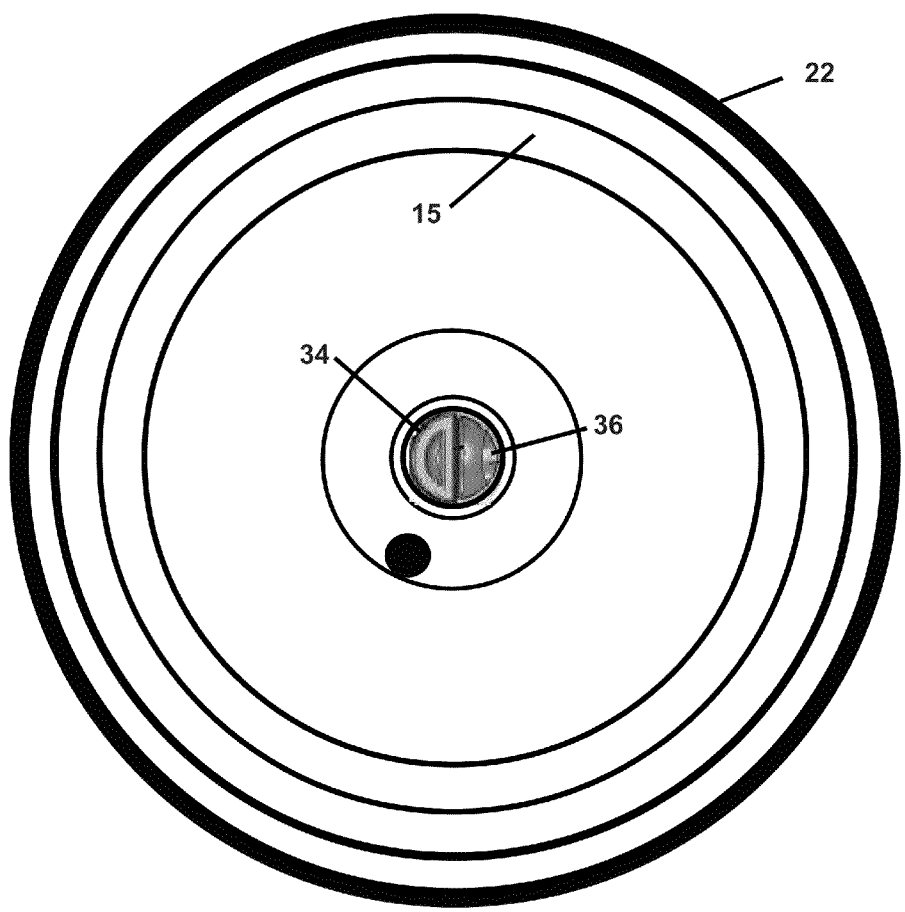
FIG. 3 is a cross-section plan view taken along lines 3-3 of FIG. 1, showing the inlet to the inner tank, showing the base of the double tank.
Figure 4:
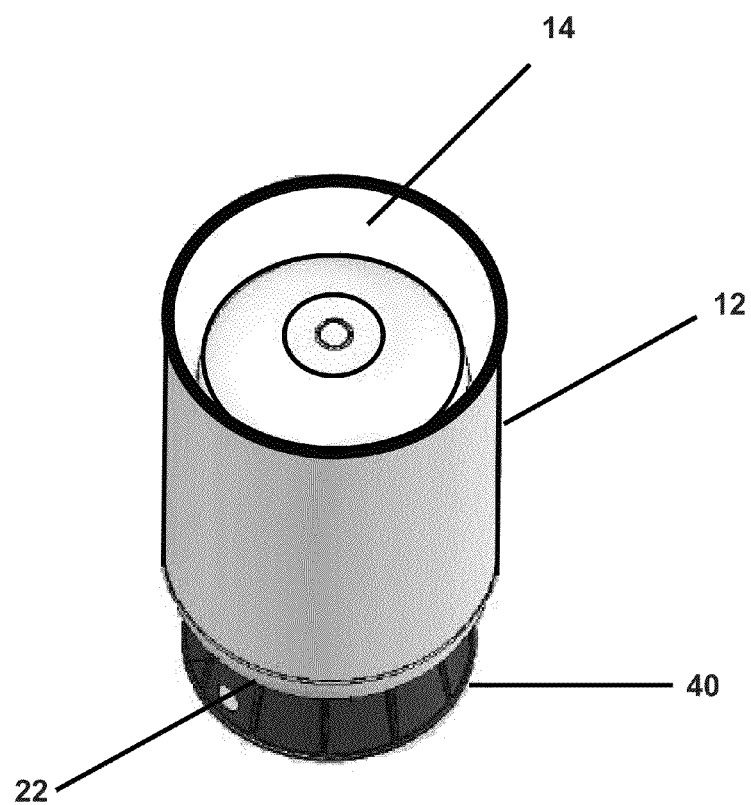
FIG. 4 is a cross-sectional view taken along lines 4-4 of FIG. 1, showing the double tank within the upper tank.
Figure 5:
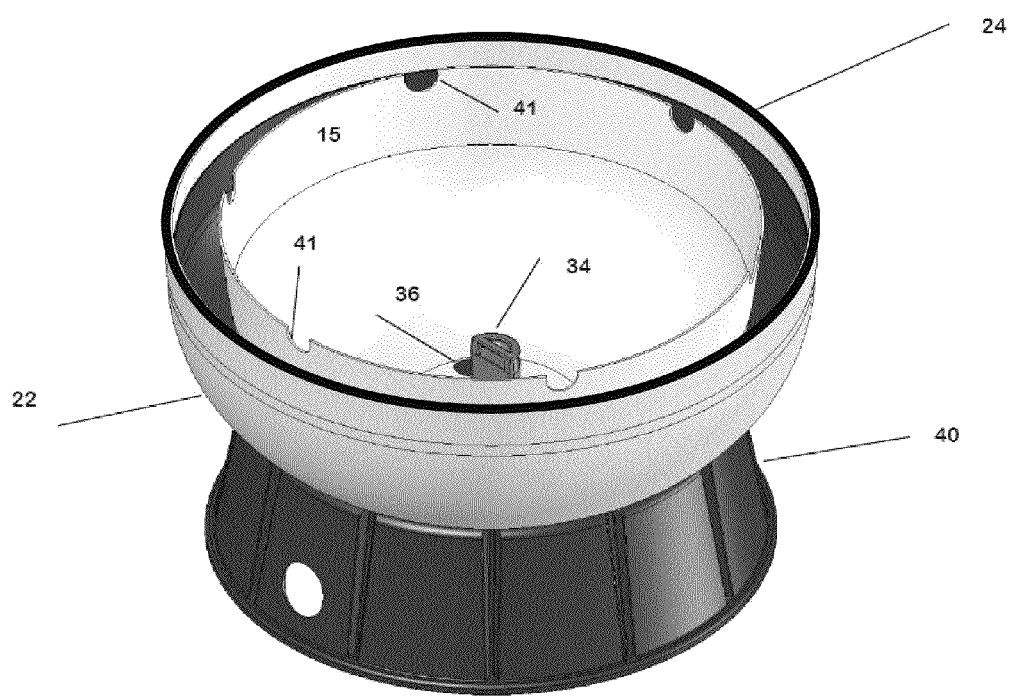
FIG. 5 is a cross-sectional view taken along lines 5-5 of FIG. 1, showing the locations of the orifices around the circumference of the inner tank wall.

The peripheral edges 13 of the upper half 17 and the lower half 15 of the inner tank 14, respectively, are connected to each other to form a seal. In the embodiments shown (see also FIG. 3) the peripheral edges 13, which project to the outside, lie against each other and are clamped together by a clench ring, which is a well-known method of sealing two halves together; the clench ring can be formed of a metal. Alternatively, the two halves can be welded, or heat-sealed, together. It should be noted that forming a seal is not critical here as long as the leakage at the joint is small compared to the flow through the apertures 41, e.g., not more than 1% of that total flow.

Figure 6:
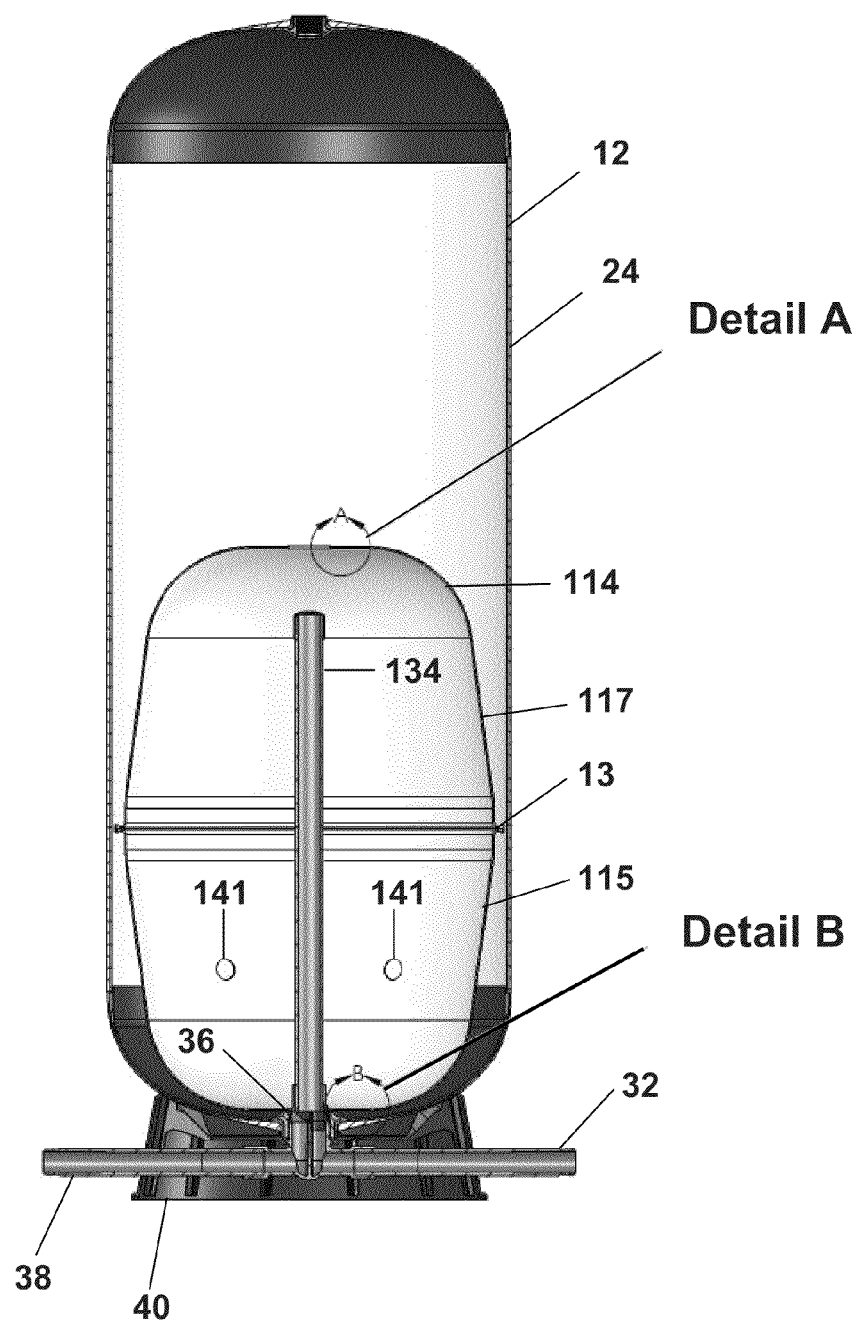
FIG. 6 is an elevation cross-sectional view showing an alternative preferred embodiment of the present invention.
Figure 7:
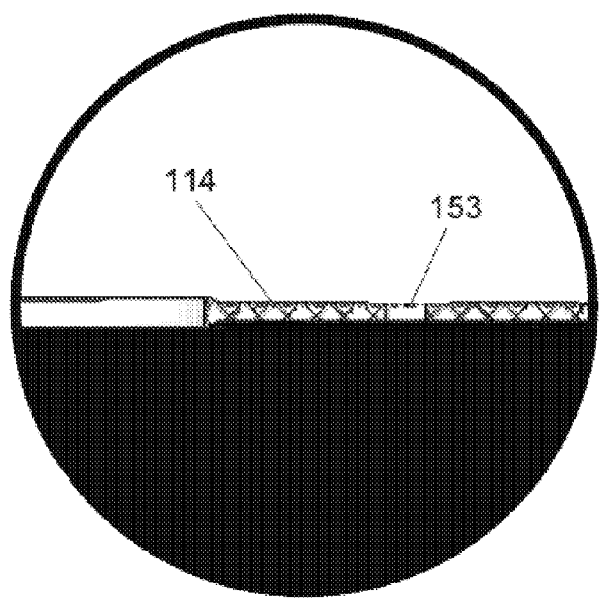
FIG. 7 is a detailed view at location "A" on FIG. 6, of the top wall of the inner tank.
Figure 8:
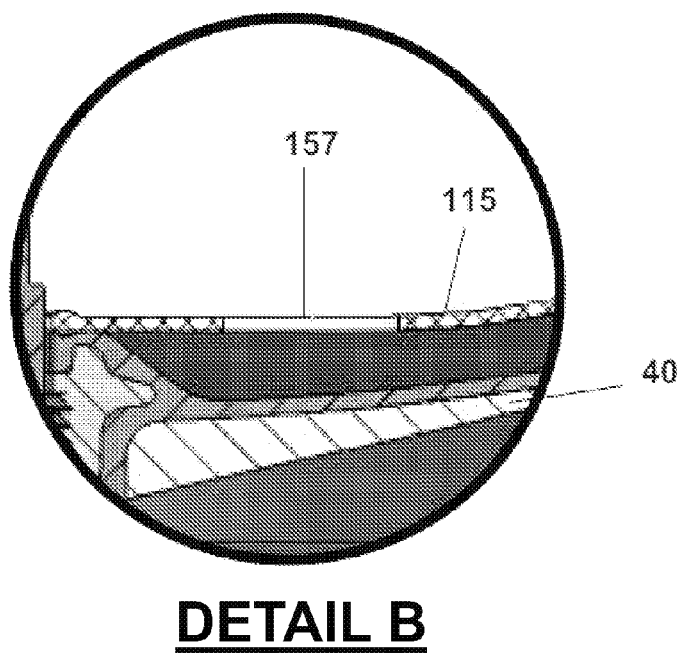
FIG. 8 is a detailed view at location "B" on FIG. 6, of the lower wall of the inner tank and the lower support structure for the inner and outer tank.

The more preferred alternative embodiment of FIG. 6 employs a longer inlet tube extending into the upper half of the inner tank volume. This provides for longer flow path in the inner tank, further improving the efficiency of the mixing, while reducing the likelihood of short-circuiting flow directly from the inlet tube 134 to the outlet openings 141. As shown in Detail A, of FIG. 7, there is also provided an air vent 153 through the top of the upper half of the inner tank wall 15, to prevent air entrapment when initially filling the inner tank. As is shown in Detail B, of FIG. 8, a drain hole 157 is included through the bottom of the lower wall 15 of the inner tank, to insure full drainage when emptying the tanks, and for cleaning to remove any precipitates that may form. This embodiment is otherwise the same as that of FIGS. 1-5, and operates in the same general manner, to improve the residence time in a disinfectant tank.

The non-flexible inner tank walls 15, 17, 115, 117, may be produced from a polymer that is relatively stiff. As the double tank is used to hold potable water, the polymer is preferably suitable for use with food and is non-toxic, non-carcinogenic, and non-mutagenic and does not leach such materials into the water. The polymer should be approved for use with food by an appropriate government agency. The polymer should preferably also be resistant to degradation by chlorine, fluorine, ozonated water, sulfur, or other chemicals that may be used to disinfect well water or other ground water sources. Exemplary materials for use in producing the non-flexible inner tank walls 32 include, but are not limited to, polypropylene, Delrin™, Teflon™, nylon, polyalkylene terephthalate, polyformaldehyde, polystyrene, poly(methyl methacrylate), polycarbonate, and poly(hexylisocyanate). Exemplary polypropylene materials for producing the non-flexible inner tank include P6E5A-004 polypropylene impact copolymer, available from Huntsman.

The outer shell 12 can be metallic or formed from a polymer. An exemplary outer shell is described in U.S. Patent Publication No. 2003/0111123. A preferred outer wall material is fiberglass-reinforced epoxy resin, with a polypropylene liner.

As shown in FIG. 1, the outer shell 12 includes a central portion 24 that defines a cylindrical side wall of tank 10. The central portion 24 is capped by a first, upper, head 20 and second, lower, head 22 to make an outer shell 12. The two heads 20 and 22 and central portion 24, can be formed from fiberglass-reinforced polymer, or can be fabricated from metal, for example, steel. Any of the polymers described above for use in the non-flexible inner tank walls can be used to form the two heads. The inner tank 14 sits within outer shell 12.

To pass into inner tank 14, 114, water must pass, within the inlet pipe 32 into and through inlet tube 34 which extends through the lower cap 22 of the outer tank 12, and through the inner tank wall 15. The conduits 32, 34 can preferably be formed of PVC or polypropylene. Those skilled in the art will be familiar with other flow-through attachments that are appropriate for use with the invention, made from many different materials suitable for this purpose.

One skilled in the art will recognize that flow-through orifices 41 may be replaced by other flow connectors.

The use of the double tank effectively prevents any significant 'shortcircuiting' of the water flow, where water would enter a tank and immediately flow out, thereby reducing the necessary residence time. It is acceptable that some of the water has a lower residence time, but the proportion is so small that there will be little or no danger of not reaching the necessary CT score.

The double tank of the present invention can be assembled by fastening the inner tank into the second lower head 22 of the outer tank and then closing central portion 24 and the upper head 20. Whether the heads and the central portion are metallic or polymeric in nature, the components can be welded together. For example, plastic components can be spin welded. One skilled in the art will recognize that one of the heads 20, 22 may be attached to the central portion 24 before fastening inner tank 14 to the second head 22. If the two heads and the shell are plastic, the assembled outer tank 12 may be wound with continuous glass fiber and epoxy resin, for example, a mixture of EPON™ and EPIKURE™, both available from Resolution Performance Products, to reinforce the walls. Alternatively, it may be wound as described in U.S. Patent Publication No. 2003/0111123.

The lower inner tank wall 15, 17 and 115, 117 with the circumferential wall apertures 41, act as flow guidance elements and establish a desirable flow pattern as shown by the arrows in FIG. 1. The flow guidance provides the necessary residence time for all of the water prior to usage, so as to insure adequate disinfecting of the water.

EXAMPLE 1

In one example of a preferred embodiment of the present invention, the inner tank has a height of 34 inches, and a diameter of 22 inches at its widest point 13, i.e., where the two halves are joined, and an internal volume of 10,000 cubic inches. The inlet tube 134 is 18 inches high. The external tank has an internal volume of 90 gallons, has a diameter of 24 inches, and is 58 inches in height.

EXAMPLE 2

In a second example of a preferred embodiment of the present invention, the inner tank has a height of 34 inches, and a diameter of 22 inches at its widest point, where the two halves are joined, and an internal volume of 10,000 cubic inches. The inlet tube 134 is 30 inches high. The external tank has an internal volume of 120 gallons, has a diameter of 24 inches, and is 65 inches in height.

Other embodiments and Examples of the invention will be apparent to those skilled in the art from a consideration of the specification or practice of the invention disclosed herein, and the scope of this invention is determined by the following claims herewith.

What is claimed is:

1. A water purification system for providing storage and the necessary residence time for the disinfecting of water, the system comprising: a double tank, including an outer tank having a vertically extending circumferential wall and a bottom wall and a top wall; and an inner tank disposed wholly within the outer tank, located adjacent to and extending vertically upwardly from the bottom wall of the outer tank, wherein the inner tank comprises an inner shell comprising an upper half and a non-flexible lower half, the two halves being sealingly connected; a liquid inlet conduit extending through the bottom wall of the outer tank and through a bottom wall portion of the lower half of the inner shell of the inner tank and into the inner tank; a series of circumferentially arranged apertures extending through the lower half of the inner shell and an air vent through the upper portion of the upper half of the inner shell, and a liquid outlet conduit extending upwardly through the top of the outer tank; so as to define a path for water to flow from the inner tank to the outer tank, and then through the outlet conduit, after a desired minimum residence time, within the tanks.

2. The water purification system of claim 1, wherein the inner tank has an outer diameter, and the outer tank has an inner diameter so that there is an intermediate space between the two tanks, within the outer tank sufficient to allow for the flow of liquid through the intermediate space, the inner tank being substantially fluidically isolated from the intermediate space between the inner tank and the outer shell except for the circumferentially arranged apertures.

3. The water purification system of claim 1, comprising a T-joint in the liquid inlet for the injection of a chlorinating compound upstream of the inner tank.

4. The water purification system of claim 1, wherein the volume of the inner tank is from about 30% to about 70% of the volume of the outer tank.

5. The water purification system of claim 1, wherein the height of the inner tank extends at least about 50% of the height of the outer tank.

6. The water purification system of claim 1, wherein the diameter of the inner tank at its widest point is up to about 95% of the diameter of the outer tank at that location.

7. The water purification system of claim 1, wherein the liquid inlet comprises a tube extending to above the midpoint of the inner tank.

8. The water purification system of claim 1, wherein the outlet conduit is centrally located through the top wall of the outer tank.

9. A water purification system for providing storage and the necessary residence time for the disinfecting of water, the system comprising: a double tank, including an outer tank; and an inner tank disposed within the outer tank, wherein the inner tank comprises a shell comprising a circumferential side wall and top and bottom walls, and the outer tank comprising a circumferential wall and upper and lower walls, the inner tank being formed, in two parts, an upper part including the upper portion of the circumferential wall and the top wall, and a lower part including the lower portion of the circumferential wall and the bottom wall, wherein the lower portion of the circumferential inner wall is non-flexible, the inner tank extending upwardly from the bottom of the outer tank; a liquid inlet extending through the bottom of the outer tank and through the bottom wall of the shell of the inner tank and into the inner tank, a series of circumferentially arranged apertures extending through the circumferential wall of the lower part of the inner tank and an air vent through the upper portion of the upper half of the inner shell, the inner tank being closed off from the outer tank except for the series of apertures and the air vent, the apertures being located around the circumferential wall of the inner tank, and vertically above the bottom wall, so as to permit any liquid entering the inner tank through the inlet to remain resident within the lower inner tank before flowing out into the outer tank through the apertures, and a liquid outlet extending through the top of the outer tank; so as to define a path for water to flow out from the outer tank after residing in the outer tank; the length of the period of residence within the inner and outer tanks being dependent upon the flow of liquid through the inlet, and then through the outlet, so as to maintain a desired minimum residence time, within the tanks.

10. A water purification system for providing storage and the necessary residence time for the disinfecting of water, the system comprising: a double tank, including an outer tank having a vertically extending circumferential wall and a bottom wall and a top wall; and an inner disposed wholly within the outer tank, located adjacent to and extending vertically upwardly from the bottom wall of the outer tank, wherein the inner tank comprises an inner shell comprising an upper half and a non-flexible lower half, the two halves being sealingly connected; a liquid inlet conduit extending through the bottom wall of the outer tank and through a bottom wall portion of the lower half of the inner shell shell of the inner tank and into the inner tank; a series of circumferentially arranged apertures extending through the lower portion of the circumferential wall of the lower half of the inner shell and an air vent through the upper portion of the upper half of the inner shell, and a liquid outlet conduit extending upwardly through the top of the outer tank; the outer tank being sealed from the outside except for the inlet conduit extending vertically through the bottom wall of the outer tank and the outlet conduit extending upwardly through the upper wall of the outer tank, the inner tank being sealed from the outside and from the outer tank except for the conduit extending vertically through the bottom wall of the outer tank and through the bottom wall of the inner tank, and the circumferentially arranged apertures so as to define a path for water to flow from the inner tank to the outer tank, and then through the outlet conduit, after a desired minimum residence time, within the tanks.

* * * * *